United States Patent
Ochi

(10) Patent No.: US 11,901,597 B2
(45) Date of Patent: Feb. 13, 2024

(54) REDOX FLOW BATTERY CELL, CELL STACK AND REDOX FLOW BATTERY SYSTEM

(71) Applicant: SUMITOMO ELECTRIC INDUSTRIES, LTD., Osaka (JP)

(72) Inventor: Yuta Ochi, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/626,173

(22) PCT Filed: Jul. 18, 2019

(86) PCT No.: PCT/JP2019/028372
§ 371 (c)(1),
(2) Date: Jan. 11, 2022

(87) PCT Pub. No.: WO2021/009929
PCT Pub. Date: Jan. 21, 2021

(65) Prior Publication Data
US 2022/0320560 A1 Oct. 6, 2022

(51) Int. Cl.
| | | |
|---|---|---|
| *H01M 8/18* | (2006.01) | |
| *H01M 4/96* | (2006.01) | |
| *H01M 8/1009* | (2016.01) | |
| *H01M 8/2465* | (2016.01) | |

(52) U.S. Cl.
CPC ............ *H01M 8/188* (2013.01); *H01M 4/96* (2013.01); *H01M 8/1009* (2013.01); *H01M 8/2465* (2013.01)

(58) Field of Classification Search
CPC .. H01M 8/188; H01M 8/1009; H01M 8/2465; H01M 4/96
See application file for complete search history.

(56) References Cited

U.S. PATENT DOCUMENTS

| | | |
|---|---|---|
| 6,509,119 B1 | 1/2003 | Kobayashi et al. |
| 2008/0038589 A1 | 2/2008 | Nakamura et al. |
| 2015/0207151 A1 | 7/2015 | Utsunomiya et al. |
| 2018/0316017 A1 | 11/2018 | Hanafusa et al. |
| 2020/0152997 A1 | 5/2020 | Nakaishi et al. |
| 2021/0143437 A1* | 5/2021 | Tomita ................. H01M 8/188 |

FOREIGN PATENT DOCUMENTS

| | | |
|---|---|---|
| CN | 101002354 A | 7/2007 |
| JP | 2003-142141 A | 5/2003 |
| JP | 2006-147374 A | 6/2006 |
| TW | 201415702 A | 4/2014 |
| WO | 2017/068944 A1 | 4/2017 |
| WO | 2017/138287 A1 | 8/2017 |

OTHER PUBLICATIONS

U.S. Appl. No. 17/626,382, filed Jan. 11, 2022 in the name of Yuta Ochi.
Apr. 12, 2023 Office Action Issued in U.S. Appl. No. 17/626,382.
Oct. 12, 2023 Office Action Issued in U.S. Appl. No. 17/626,382.

* cited by examiner

*Primary Examiner* — Karie O'Neill Apicella
(74) *Attorney, Agent, or Firm* — Oliff PLC

(57) ABSTRACT

A redox flow battery cell includes a positive electrode and a negative electrode, and each of the positive electrode and the negative electrode is an assembly containing a plurality of carbon fibers, and a quantity per unit area of the negative electrode is larger than a quantity per unit area of the positive electrode.

8 Claims, 2 Drawing Sheets

REDOX FLOW BATTERY CELL, CELL STACK AND REDOX FLOW BATTERY SYSTEM

TECHNICAL FIELD

The present disclosure relates to a redox flow battery cell, a cell stack and a redox flow battery system.

BACKGROUND ART

As one of storage batteries, there is a redox flow battery. In a redox flow battery, charge and discharge are performed with a positive-electrode electrolyte solution and a negative-electrode electrolyte solution supplied to a positive electrode and a negative electrode, respectively. PTL 1 discloses operating a redox flow battery in such a manner that a state of charge (SOC) of a negative-electrode electrolyte solution becomes no less than 75% and no more than 95%.

CITATION LIST

Patent Literature

PTL 1: Japanese Patent Laying-Open No. 2006-147374

SUMMARY OF INVENTION

A redox flow battery cell of the present disclosure includes a positive electrode and a negative electrode, and
  each of the positive electrode and the negative electrode is an assembly containing a plurality of carbon fibers and
  a quantity per unit area of the negative electrode is larger than a quantity per unit area of the positive electrode.
A cell stack of the present disclosure includes a plurality of the redox flow battery cells of the present disclosure.
A redox flow battery system of the present disclosure includes the redox flow battery cell of the present disclosure or the cell stack of the present disclosure.

DETAILED DESCRIPTION

Figure 1:
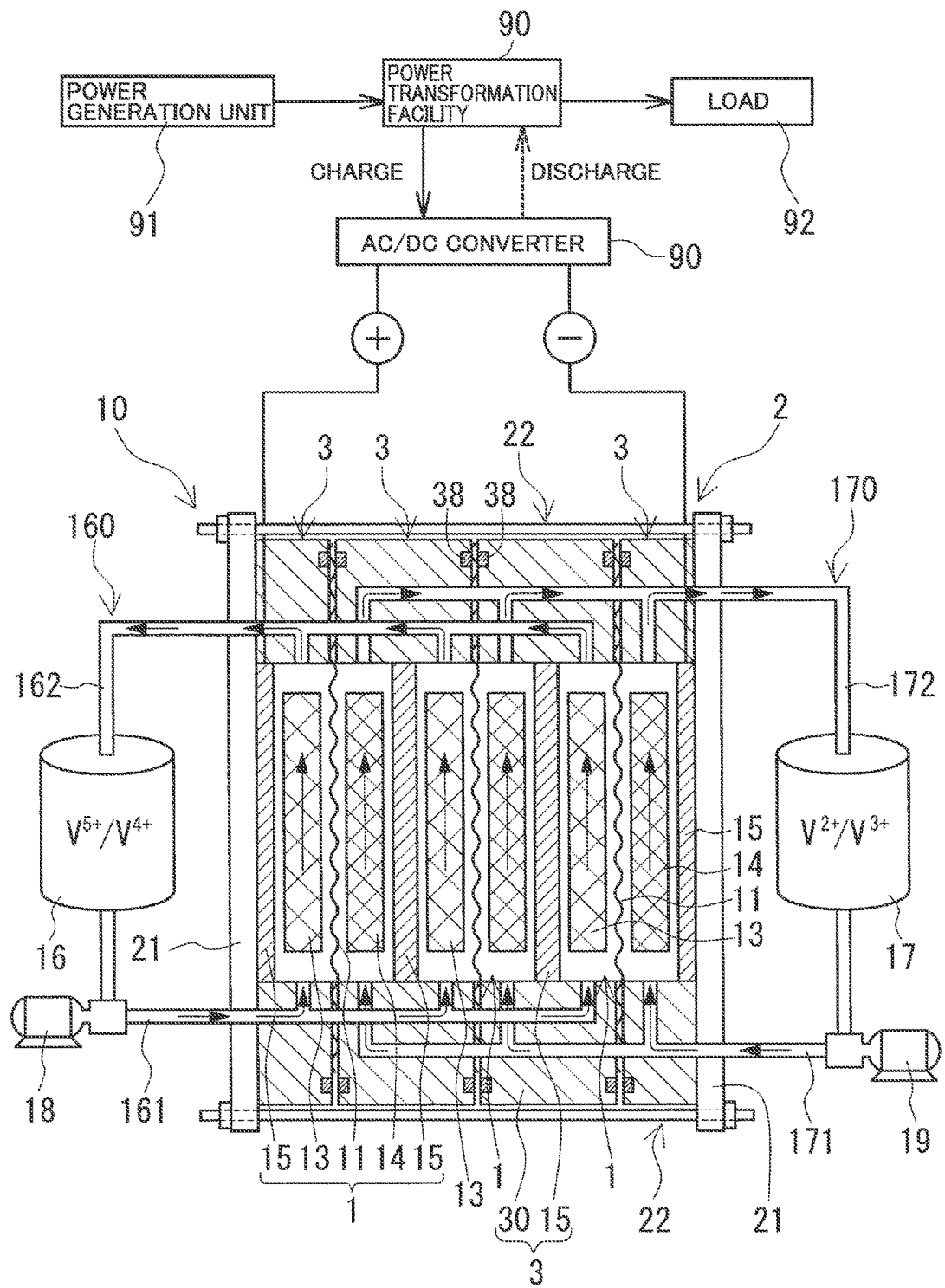
FIG. 1 is a configuration diagram illustrating an overview of a redox flow battery system according to an embodiment.

Problem to be Solved by the Present Disclosure

It is desirable to reduce an amount of hydrogen gas generated in a redox flow battery.

In a redox flow battery, an electrolyte solution formed of an aqueous solution, for example, a vanadium-based electrolyte solution described in PTL 1 is used. Where a negative-electrode electrolyte solution is an aqueous solution, as an SOC rises along with progress of charging, electrolysis of water tends to occur in a negative-electrode cell including a negative electrode. Therefore, on the negative electrode side, hydrogen gas is easily generated. In a state in which the SOC exceeds 100%, that is, an overcharge state, an amount of hydrogen gas generated tends to be large because of electrolysis of water.

As described in PTL 1, overcharge can be prevented by performing charge-discharge operation in such a manner that the SOC of the electrolyte solution remains within a predetermined range by monitoring the SOC. As a result, the amount of hydrogen gas generated tends to be small. However, if the SOC cannot properly be measured because of, e.g., a failure of an SOC monitoring device, for example, a device that measures an open circuit voltage (OCV), control to stop charging when the SOC reaches a predetermined value that is less than 100% cannot be performed. Therefore, the amount of hydrogen gas generated may become large. Therefore, it is desirable to prevent overcharging of the negative-electrode electrolyte solution without monitoring the SOC or the OCV, and thus to enable reduction in amount of hydrogen gas generated.

Therefore, an object of the present disclosure is to provide a redox flow battery cell that enables reduction in amount of hydrogen gas generated. Also, another object of the present disclosure is to provide a cell stack and a redox flow battery system that enable reduction in amount of hydrogen gas generated.

Advantageous Effect of the Present Disclosure

The redox flow battery cell of the present disclosure, the cell stack of the present disclosure and the redox flow battery system of the present disclosure enable reduction in amount of hydrogen gas generated.

DESCRIPTION OF EMBODIMENTS

First, a list and description of embodiments of the present disclosure will be provided.

(1) A redox flow battery cell according to an aspect of the present disclosure includes a positive electrode and a negative electrode, and
  each of the positive electrode and the negative electrode is an assembly containing a plurality of carbon fibers and
  a quantity per unit area of the negative electrode is larger than a quantity per unit area of the positive electrode.

Hereinafter, "redox flow battery cell" may be referred to as "RF battery cell".

The RF battery cell of the present disclosure enables reduction in amount of hydrogen gas generated on the negative electrode side because of the following reasons. In particular, the RF battery cell of the present disclosure enables reduction in amount of hydrogen gas generated without monitoring a state of charge (SOC) or an open circuit voltage (OCV).

A positive-electrode electrolyte solution used in a RF battery may contain highly oxidative ions. Hereinafter, highly oxidative ions may be referred to as "oxidizer ions". For example, in the aforementioned vanadium-based electrolyte solution, the oxidizer ions are vanadium (V) ions. Where the positive electrode is an assembly containing a plurality of carbon fibers, the positive electrode is oxidized by the oxidizer ions such as vanadium (V) ions. As charging progresses, the oxidizer ions such as vanadium (V) ions increase in the positive-electrode electrolyte solution, and thus, oxidation of the positive electrode easily progresses.

In a positive electrode having a relatively small quantity per unit area, as charging progresses, oxidation easily progresses because of the aforementioned oxidizer ions. Along with the oxidation of the positive electrode, carbon dioxide gas is easily generated on the positive electrode side. Therefore, stopping charging based on an amount of carbon dioxide gas generated enables preventing overcharging of the negative-electrode electrolyte solution. In other words, on the negative electrode side, the amount of hydrogen gas generated is reduced. Also, using a phenomenon attributable to a decrease in battery reactivity in the positive electrode as a trigger for stopping charging enables proper operation without monitoring the SOC or the OCV.

(2) An example of the RF battery cell of the present disclosure may be an example in which a ratio of the quantity per unit area of the negative electrode to the quantity per unit area of the positive electrode is no less than 105%.

Under same operating conditions, in a case where the above ratio is no less than 105%, as charging progresses, the amount of carbon dioxide gas generated tends to be large on the positive electrode side in comparison with a case where the above ratio is less than 105%. Therefore, stopping charging based on the amount of carbon dioxide gas generated enables more reliably preventing overcharging of the negative-electrode electrolyte solution.

(3) An example of the RF battery cell of the present disclosure may be an example in which the quantity per unit area of the positive electrode and the quantity per unit area of the negative electrode are no less than 20 g/m$^2$ and no more than 500 g/m$^2$.

The above example enables easily adjusting a cell resistance into a practical range.

(4) An example of the RF battery cell of the present disclosure may be an example in which an average fiber diameter of the carbon fiber is no more than 20 μm.

In the above example, in comparison with a case where the average fiber diameter is more than 20 μm, as charging progresses, the battery reactivity of the positive electrode tends to be lowered. Therefore, as charging progresses, the amount of carbon dioxide gas generated tends to be large on the positive electrode side. Accordingly, stopping charging based on the amount of carbon dioxide gas generated enables more reliably preventing overcharging of the negative-electrolyte solution.

(5) A cell stack according to an aspect of the present disclosure includes a plurality of the RF battery cells according to any one of (1) to (4) above.

For the aforementioned reasons, the cell stack of the present disclosure enables reduction in amount of hydrogen gas generated on the negative electrode side without monitoring the SOC or the OCV.

(6) A redox flow battery system according to an aspect of the present disclosure includes the RF battery cell according to any one of (1) to (4) above or the cell stack according to (5) above.

Hereinafter, "redox flow battery system" may be referred to as "RF battery system".

For the above reasons, the RF battery system of the present disclosure enables reduction in amount of hydrogen gas generated on the negative electrode side without monitoring the SOC or the OCV.

DETAILS OF THE EMBODIMENTS OF THE PRESENT DISCLOSURE

The redox flow battery cell, the cell stack and the redox flow battery system of the embodiments of the present disclosure will be described below with reference to the drawings. In the drawings, signs that are same denote elements of same names.

EMBODIMENTS

An overview of an RF battery cell 1 of an embodiment, a cell stack 2 of an embodiment and an RF battery system 10 of an embodiment will be described with reference to FIGS. 1 and 2. Then, a positive electrode 13 and a negative electrode 14 included in RF battery cell 1 of the embodiment will be described in detail.

(Overview)

RF battery cell 1 of an embodiment includes a positive electrode 13 and a negative electrode 14 and is used for a main element of RF battery system 10. RF battery system 10 is one of electrolyte solution circulation-type storage batteries and performs charge and discharge with a positive-electrode electrolyte solution and a negative-electrode electrolyte solution supplied to positive electrode 13 and negative electrode 14, respectively.

In particular, in RF battery cell 1 of the embodiment, each of positive electrode 13 and negative electrode 14 is an assembly containing a plurality of carbon fibers. Also, a quantity per unit area $W_4$ of negative electrode 14 is larger than a quantity per unit area $W_3$ of positive electrode 13. In other words, $W_3 < W_4$ and $W_3 \neq W_4$. In RF battery cell 1, an amount of hydrogen gas generated on the negative electrode side is reduced by use of the difference between quantities per unit area $W_3$, $W_4$. In FIGS. 1 and 2, positive electrode 13 and negative electrode 14 are cross-hatched.

Cell stack 2 of an embodiment includes a plurality of RF battery cells 1 of the embodiment. RF battery system 10 of an embodiment includes RF battery cell 1 of the embodiment or cell stack 2 of the embodiment.

(Battery Cell)

Each RF battery cell 1 typically includes a positive electrode 13, a negative electrode 14 and a separator 11 and is built using later-described cell frames 3. Positive electrode 13 and negative electrode 14 each provide a field for battery reaction. Separator 11 is interposed between positive electrode 13 and negative electrode 14 and separates positive electrode 13 and negative electrode 14 from each other. Examples of separator 11 include, e.g., an ion-exchange membrane.

Each cell frame 3 includes a bipolar plate 15 and a frame body 30. Bipolar plate 15 is a conductive plate. A constituent material of bipolar plate 15 may be, for example, conductive plastic. As illustrated in FIG. 2, frame body 30 is an insulating frame plate disposed around bipolar plate 15. A constituent material of frame body 30 may be, for example, resin such as vinyl chloride resin.

Figure 2:
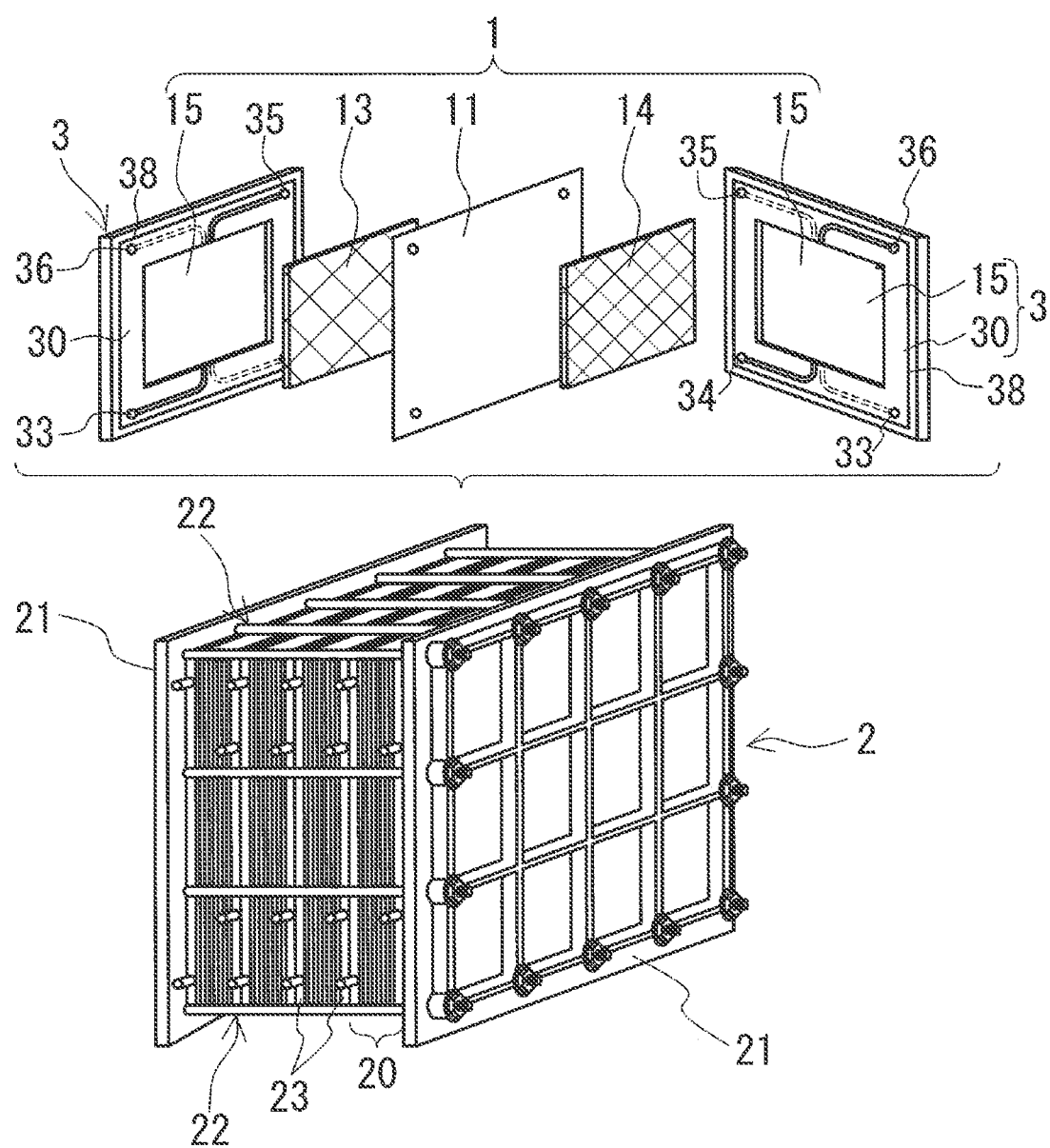
FIG. 2 is a perspective view illustrating an overview of a battery cell according to an embodiment and a cell stack according to an embodiment.

As illustrated in the cell frame 3 on the left side of the sheet of the exploded view in FIG. 2, each frame body 30 includes a solution-supply manifold 33, a solution-drainage manifold 35 and slits for a positive-electrode electrolyte solution. One surface of frame body 30 supplies a positive-electrode electrolyte solution to positive electrode 13 on bipolar plate 15 using solution-supply manifold 33 and the solution supply-side slit. Also, the one surface of frame body 30 drains the positive-electrode electrolyte solution from positive electrode 13 using solution-drainage manifold 35 and the solution-drainage-side slit. As illustrated in the cell frame 3 on the right side of the sheet of the exploded view in FIG. 2, each frame body 30 includes a solution-supply manifold 34, a solution-drainage manifold 36 and slits for a negative-electrode electrolyte solution. As with positive electrode 13 described above, another surface of frame body 30 supplies a negative-electrode electrolyte solution to negative electrode 14 and drains the negative-electrode electrolyte solution from negative electrode 14.

As illustrated in the exploded view in FIG. 2, a single-cell battery including one RF battery cell 1 includes a cell frame 3, a positive electrode 13, a separator 11, a negative electrode 14 and a cell frame 3 and is built by these components being arranged in the order mentioned. A multi-cell battery including a plurality of RF battery cells 1 includes a plurality of positive electrodes 13, a plurality of negative electrodes 14, a plurality of separators 11 and three or more cell frames 3. As illustrated in FIGS. 1 and 2, the multi-cell battery includes a stack body in which a cell frame 3, a positive electrode 13, a separator 11 and a negative electrode 14 are stacked in the order mentioned. As illustrated in FIG. 1, a bipolar plate 15 of each of cell frames 3 included in the stack body is typically interposed between relevant positive electrode 13 and relevant negative electrode 14.

(Cell Stack)

In the multi-cell battery, a form called a cell stack is used for RF battery cells 1. As illustrated in FIGS. 1 and 2, cell stack 2 typically includes the above-described stack body, a pair of end plates 21 and a plurality of fastening members 22. The pair of end plates 21 holds the stack body therebetween. Each fastening member 22 typically includes a long bolt and a nut. The plurality of fastening members 22 fasten end plates 21 to each other. Each of frame bodies 30 in the present example includes a seal material 38. The stack body is held in a liquid-tight manner by means of the above fastening and seal material 38.

As illustrated in FIG. 2, cell stack 2 may include a plurality of sub cell stacks 20. Each sub cell stack 20 includes a stack body of a predetermined number of RF battery cells 1, and a pair of supply/drainage plates 23 that hold the stack body therebetween. Pipings 160, 170, which are illustrated in FIG. 1, are connected to supply/drainage plates 23.

(RF Battery System)

RF battery system 10 includes an RF battery cell 1, and a circulation mechanism that supplies a positive-electrode electrolyte solution and a negative-electrode electrolyte solution to RF battery cell 1. The RF battery cell 1 included in RF battery system 10 may be a cell stack 2. The same applies to the below in this section.

As illustrated in FIG. 1, RF battery cells 1 are typically connected to a power generation unit 91 and a load 92 via intervening devices 90. With the positive-electrode electrolyte solution and the negative-electrode electrolyte solution supplied, RF battery cells 1 perform charging using power generation unit 91 as a power supply source and perform discharging to load 92 that is a power providing target. Intervening devices 90 may be, for example, an AC/DC converter or a power transformation facility. Power generation unit 91 may be, for example, a solar power generator, a wind power generator or another general power plant. Load 92 may be, for example, a power system or a consumer of power. RF battery system 10 is used for, for example, load equalization, instantaneous voltage drop compensation or an emergency power source or output equalization of renewable energy power generation such as photovoltaic power generation or wind power generation.

<Circulation Mechanism>

The circulation mechanism includes tanks 16, 17, pipings 160, 170 and pumps 18, 19. Tank 16 stores the positive-electrode electrolyte solution. Tank 17 stores the negative-electrode electrolyte solution. Piping 160 includes an outward piping 161 and a return piping 162. Piping 170 includes an outward piping 171 and a return piping 172. Pipings 160, 170 are connected to respective tanks 16, 17 and RF battery cells 1. Pumps 18, 19 are connected to respective outward pipings 161, 171. The positive-electrode electrolyte solution from tank 16 and the negative-electrode electrolyte solution from tank 17 are supplied to positive electrodes 13 and negative electrodes 14 of RF battery cells 1 through outward pipings 161, 171 by pumps 18, 19, respectively. The positive-electrode electrolyte solution from positive electrodes 13 and the negative-electrode electrolyte solution from negative electrodes 14 return to tanks 16, 17 through return pipings 162, 172, respectively. The black pointed arrows in FIG. 1 indicate flows of the electrolyte solutions.

(Electrolyte Solutions)

For the electrolyte solutions, a solution containing ions that function as an active material, that is, a solution containing active material ions can be employed. As a typical electrolyte solution used for RF battery system 10, there is an aqueous solution containing active material ions and an acid. Examples of positive-electrode active material ions include, e.g., vanadium ions, manganese ions and iron ions. Examples of negative-electrode active material ions include, e.g., vanadium ions, titanium ions and chromium ions. In the case of vanadium-based electrolyte solutions, the positive-electrode active material ions and the negative-electrode active material ions are both vanadium ions and are different from each other in valence of vanadium ion. In FIG. 1, an example in which vanadium ions having different valences are employed as the positive-electrode active material ions and the negative-electrode active material ions is illustrated.

In RF battery cells 1, cell stack 2 and RF battery system 10, for e.g., a basic configuration and constituent materials and composition of the electrolyte solutions, those that are publicly known may be used.

(Electrodes)

For each of positive electrode 13 and negative electrode 14 included in RF battery cell 1 of the embodiment, an assembly containing a plurality of carbon fibers is used. Hereinafter, an assembly containing a plurality of carbon fibers may be referred to as "fiber assembly". The fiber assembly may be, for example, carbon felt, carbon cloth or carbon paper.

<Quantities Per Unit Area>

Although each of positive electrode 13 and negative electrode 14 is the aforementioned fiber assembly, but positive electrode 13 and negative electrode 14 are different in quantity per unit area of the fiber assembly. A quantity per unit area of a fiber assembly here means a mass per unit area of a fiber assembly, and here, a gram per square meter ($g/m^2$).

<<Quantities-Per-Unit-Area Ratio>>

Quantitatively, a ratio of quantity per unit area $W_4$ of negative electrode 14 to quantity per unit area $W_3$ of positive electrode 13 [$(W_4/W_3) \times 100$] exceeds 100%, and $W_3 < W_4$. Hereinafter, the ratio is referred to as "quantity-per-unit-area ratio".

Because of quantity per unit area $W_3$ of positive electrode 13 being relatively small, as charging progresses, battery reactivity of positive electrode 13 tends to be lowered in comparison with battery reactivity of negative electrode 14.

More specifically, upon a charge operation of the RF battery cell 1, as the charging progresses, in a negative-electrode cell including negative electrode 14, where the electrolyte solution is a vanadium-based electrolyte solution, which is an aqueous solution, electrolysis of water tends to occur. On the other hand, in a positive-electrode cell including positive electrode 13, as the charging progresses, charging ions, for example, vanadium (V) ions in the vanadium-based electrolyte solution, increases. In positive electrode 13, the quantity per unit area of which is relatively small, there are relatively many oxidizer ions such as vanadium (V) ions in comparison with a case where the quantity per unit area is the same as that of negative electrode 14. Therefore, in positive electrode 13, the quantity per unit area of which is relatively small, oxidation easily progresses. Along with the oxidation of the positive electrode 13, carbon dioxide gas is generated on the positive electrode side.

Therefore, it is possible to stop charging before overcharging of the negative-electrode electrolyte solution, based on an amount of carbon dioxide gas generated. Therefore, electrolysis of water does not easily occur in the negative-electrode electrolyte solution. Consequently, an amount of hydrogen gas generated is reduced on the negative electrode side.

As the aforementioned quantity-per-unit-area ratio is larger, the amount of hydrogen gas generated is more easily reduced. The quantity-per-unit-area ratio is, for example, no less than 105%.

Under same operation conditions, in a case where the quantity-per-unit-area ratio is no less than 105%, as charging progresses, the amount of carbon dioxide gas generated easily increases in comparison with a case where the quantity-per-unit-area ratio is more than 100% and less than 105%. Therefore, stopping charging based on the amount of carbon dioxide gas generated more reliably prevents overcharging of the negative-electrode electrolyte solution. As a result, the amount of hydrogen gas generated easily becomes smaller.

Where the aforementioned quantity-per-unit-area ratio is no less than 110%, more specifically no less than 115%, even more specifically no less than 120%, it is possible to stop charging to an extent that electrolysis of water does not easily occur or does not substantially occur. Therefore, the amount of hydrogen gas generated more easily becomes smaller.

Where the aforementioned quantity-per-unit-area ratio is, for example, no more than 190%, it is conceivable that even if charging progresses, the amount of carbon dioxide gas generated tends to remain within an allowable range. Where the quantity-per-unit-area ratio is no more than 185%, more specifically no more than 180%, the amount of carbon dioxide gas generated further easily becomes smaller. Also, a drastic decrease in battery capacity is prevented.

<<Absolute Value>>

Quantity per unit area $W_3$ of positive electrode 13 and quantity per unit area $W_4$ of negative electrode 14 may be, for example, no less than 20 $g/m^2$ and no more than 500 $g/m^2$.

Where quantities per unit area $W_3$, $W_4$ are both no less than 20 $g/m^2$, an amount of carbon fibers loaded is not too small and positive electrode 13 and negative electrode 14 can each properly function as a battery reaction field. Therefore, an RF battery cell 1 that is not too large in cell resistance and that is convenient can be provided. As quantities per unit area $W_3$, $W_4$ are larger, positive electrode 13 and negative electrode 14 are more excellent in battery reactivity. Therefore, it is possible to provide an RF battery cell 1 that is small in cell resistance.

If quantities per unit area $W_3$, $W_4$ are both no more than 500 $g/m^2$, the amount of carbon fibers loaded is not too large and the electrolyte solutions easily flow. Because the electrolyte solutions are easily supplied, positive electrode 13 and negative electrode 14 can each perform battery reaction in a favorable manner. In this regard, it is possible to provide an RF battery cell 1 that is small in cell resistance.

According to the above, the RF battery cell 1 with the above quantity-per-unit-area ratio exceeding 100% and quantities per unit area $W_3$, $W_4$ falling within a range of no less than 20 $g/m^2$ and no more than 500 $g/m^2$ enables easily adjusting the cell resistance into a practical range.

If quantities per unit area $W_3$, $W_4$ are both no less than 50 $g/m^2$, more specifically no less than 60 $g/m^2$, even more specifically no less than 100 $g/m^2$, the battery reactivity is enhanced. If quantities per unit area $W_3$, $W_4$ are no more than 490 $g/m^2$, more specifically no more than 480 $g/m^2$, even more specifically no more than 470 $g/m^2$, the electrolyte solutions are excellent in circulation and are supplied to positive electrode 13 and negative electrode 14 in a favorable manner.

Where the quantity-per-unit-area ratio exceeds 100% and quantities per unit area $W_3$, $W_4$ are no less than 50 $g/m^2$ and no more than 490 $g/m^2$, more specifically no less than 100 $g/m^2$ and no more than 470 $g/m^2$, RF battery cell 1 is excellent in battery reactivity and electrolyte solution circulation. In particular, where the quantity-per-unit-area ratio exceeds 100% and quantities per unit area $W_3$, $W_4$ are no less than 50 $g/m^2$ and no more than 200 $g/m^2$, RF battery cell 1 is excellent in battery reactivity and is also more excellent in electrolyte solution circulation and easily becomes smaller in cell resistance. Where the quantity-per-unit-area ratio exceeds 100% and quantities per unit area $W_3$, $W_4$ are, for example, no less than 300 $g/m^2$ and no more than 450 $g/m^2$, RF battery cell 1 is excellent in battery reactivity.

<Fiber Diameter>

In each of the fiber assembles included in positive electrode 13 and negative electrode 14, generally, as an average fiber diameter of the carbon fibers is smaller, the cell resistance tends to be smaller. A reason for this is as follows. Where the quantity per unit area is constant, as the average fiber diameter is smaller, the number of carbon fibers included in the fiber assembly tends to be larger. As the number of carbon fibers is larger, the total surface area of carbon fibers in the carbon assembly tends to larger. As the surface area of the fiber assembly is larger, the battery reactivity tends to be higher. As a result, it is possible to perform battery reaction in a favorable manner and the cell resistance thus tends to be smaller. From the perspective of cell resistance reduction, the average fiber diameter may be, for example, no more than 20 µm.

On the other hand, in the fiber assembly included in positive electrode 13, where the average fiber diameter of the carbon fibers is no more than 20 µm, as charging progresses, the battery reactivity tends to be lowered in comparison with a case where the average fiber diameter exceeds 20 µm. One of reasons for this can be that in positive electrode 13, carbon components are reduced because of oxidation. Since the battery reactivity of positive electrode 13 is easily lowered because of the fiber diameter in addition to the difference in quantity per unit area, as charging progresses, the amount of carbon dioxide gas generated tends to be large. Therefore, stopping charging based on the amount of carbon dioxide gas generated more reliably prevents overcharging of the negative-electrode electrolyte solution.

If the average fiber diameter is, for example, no more than 18 more specifically no more than 15 µm, overcharging of the negative-electrode electrolyte solution can easily be prevented while an RF battery cell 1 that is small in cell resistance being provided. If the average fiber diameter is, for example, no less than 1 and no more than 20 the fiber assembly is excellent in mechanical strength as well as battery reactivity.

The average fiber diameter is calculated as follows. A section of the fiber assembly is obtained by cutting the fiber assembly along a plane that is parallel to a thickness direction. A diameter of a circle having an area that is equal to a sectional area of a carbon fiber in one section is determined as a fiber diameter of the carbon fiber. Five or more fields of view are employed for one section, and fiber diameters of three or more carbon fibers are measured for each field of view. An average of the 15 or more measured fiber diameters is determined as an average fiber diameter.

<Others>

A plane area and a thickness of positive electrode 13 and negative electrode 14 can appropriately be selected as long as the plane area and the thickness meet the above-described quantity-per-unit-area ratio. A planar shape of positive electrode 13 and negative electrode 14 can appropriately be selected. A typical planar shape can be a rectangular shape, which is illustrated in FIG. 2.

(Major Operation and Effects)

In RF battery cell 1 of the embodiment, quantity per unit area $W_4$ of negative electrode 14 is larger than quantity per unit area $W_3$ of positive electrode 13, and thus, a phenomenon based on a difference between the battery reactivity of positive electrode 13 and the battery reactivity of negative electrode 14 can be used for operation control. Stopping charging based on the above phenomenon, for example, generation of carbon dioxide gas due to oxidation of positive electrode 13, enables preventing overcharging of the negative-electrode electrolyte solution without monitoring an SOC or an OCV. Consequently, the amount of hydrogen gas generated is reduced on the negative electrode side.

Cell stack 2 of the embodiment and RF battery system 10 of the embodiment include RF battery cell 1 of the embodiment. Therefore, as described above, stopping charging based on generation of carbon dioxide gas causes reduction in amount of hydrogen gas generated on the negative electrode side without measuring the SOC or the OCV.

Test Example 1

RF battery cells with different combinations of quantities per unit area of positive electrodes and quantities per unit area of negative electrodes were built and charge and discharge were conducted with the RF battery cells to investigate a relationship between the quantities per unit area and amounts of hydrogen gas generated.

Here, each of the positive electrodes and the negative electrodes is carbon felt, an average fiber diameter of carbon fibers of which is no more than 20 μm, and has the relevant quantity per unit area (g/m$^2$) indicated in Table 1. Also, a quantity-per-unit-area ratio (%) in each sample is indicated in Table 1. A quantity-per-unit-area ratio (%) is a ratio of a quantity per unit area of a negative electrode where a quantity per unit area of a positive electrode is 100%, and is calculated by (quantity per unit area of negative electrode/quantity per unit area of positive electrode)×100.

The RF battery cells in the respective samples are single-cell batteries having substantially similar specifications except the quantity per unit area differences. The specifications include, e.g., a structure of the single-cell battery, and sizes of members included in the single-cell battery, for example, a plane area of each electrode. Because of the quantity per unit area differences, initial values of cell resistivities in the respective samples are different. For the initial values of the cell resistivities in the respective samples, relative values based on an initial value of a cell resistivity of sample No. 100 are indicated in Table 1. The initial values of the cell resistivities (Ω·cm$^2$) here were obtained by conducting charging and discharging under the following conditions using the single-cell batteries of the respective samples.

(Charge and Discharge Conditions)

Three charge-discharge cycles were conducted under the condition that switching between charge and discharge is performed upon a predetermined switching voltage set in advance being reached. The charge and discharge were conducted using a constant current with a current density of 90 mA/cm$^2$. Each of electrolyte solutions used is a vanadium-based electrolyte solution, that is, a vanadium sulfate aqueous solution. A vanadium ion concentration of the electrolyte solution is 2 mol/L.

An average voltage and an average current in a first cycle were calculated, and furthermore, a resistance value=(average voltage/average current) was calculated. An initial value of a cell resistivity is a value calculated by the product of the resistance value and the plane area of each electrode.

An amount of carbon dioxide gas generated on the positive electrode side and an amount of hydrogen gas generated on the negative electrode side until the end of the three charge-discharge cycles under the above conditions were investigated, respectively, and Table 1 indicates results of the investigation. The amount of carbon dioxide gas generated is a ratio (vol ppm) relative to a volume of gas phase present in a tank that stores the positive-electrode electrolyte solution. The amount of hydrogen gas generated is a ratio (vol ppm) relative to a volume of gas phase present in a tank that stores the negative-electrode electrolyte solution. Each of the amount of carbon dioxide gas generated and the amount of hydrogen gas generated was measured by gas chromatography.

After the end of the three charge-discharge cycles under the above conditions, the cell resistivities of the respective samples were measured. Each of the cell resistivities is a value calculated by obtaining an average voltage and an average current in a third cycle and further calculating the product of a resistance value=(average voltage/average current) and the plane area of each electrode. An amount of increase in the cell resistivity in the third cycle relative to the initial value of the cell resistivity was calculated and Table 1 indicates results of the calculation. The amount of increase in cell resistance was calculated by (cell resistivity in third cycle/initial value of cell resistivity).

TABLE 1

| | Quantity per unit area g/m² | | Quantity-per-unit-area ratio % | | Amount of carbon dioxide gas | Amount of hydrogen gas | Initial value of cell resistivity | Amount of increase in cell resistance Relative value relative to |
|---|---|---|---|---|---|---|---|---|
| Sample No. | Positive electrode | Negative electrode | Positive electrode | Negative electrode | generated Vol ppm | generated Vol ppm | Relative value | initial value |
| 1   | 220 | 232 | 100 | 105 | 644 | 24  | 0.91 | 1.18 |
| 2   |  24 |  28 | 100 | 117 | 402 | 12  | 0.59 | 1.23 |
| 3   | 238 | 289 | 100 | 121 | 353 |  2  | 0.89 | 1.35 |
| 4   | 378 | 494 | 100 | 131 | 801 |  5  | 0.86 | 1.43 |
| 5   | 280 | 394 | 100 | 141 | 552 |  9  | 0.84 | 1.60 |
| 6   | 115 | 182 | 100 | 158 | 491 |  7  | 0.87 | 1.72 |
| 7   |  79 | 140 | 100 | 177 | 303 |  2  | 0.69 | 1.96 |
| 100 |  11 |  11 | 100 | 100 |  15 | 690 | 1    | 1    |
| 101 | 555 | 564 | 100 | 102 |  46 | 420 | 1.32 | 1.04 |
| 102 | 301 | 311 | 100 | 103 |  63 | 420 | 0.91 | 1.04 |
| 103 |  16 |  18 | 100 | 113 |  12 | 558 | 1.21 | 1.05 |
| 104 | 600 | 670 | 100 | 112 |  88 | 387 | 1.36 | 1.09 |

As indicated in Table 1, it can be seen that the differences in quantity per unit area cause differences in amount of hydrogen gas generated on the negative electrode side. More specifically, in sample No. 100 in which the quantity per unit area of the positive electrode and the quantity per unit area of the negative electrode are equal to each other, that is, the quantity-per-unit-area ratio is 100%, the amount of hydrogen gas generated was around 700 vol ppm. On the other hand, in each of sample Nos. 1 to 7 in which the quantity per unit area of the negative electrode is larger than the quantity per unit area of the positive electrode, that is, the quantity-per-unit-area ratio exceeds 100%, the amount of hydrogen gas generated was 30 vol ppm or less, which is smaller than that of sample No. 100. Accordingly, it can be considered that in sample Nos. 1 to 7, electrolysis of water did not easily occur at the time of the end of the charging in comparison with sample No. 100. Hereinafter, sample Nos. 1 to 7 may be referred to as "specific sample group".

Also, in each battery cell in the specific sample group, the amount of carbon dioxide gas generated is larger than that of sample No. 100. A reason for this can be considered as follows. In each positive-electrode cell in the specific sample group, as charging progresses, oxidation of the positive electrode easily progresses because of vanadium (V) ions. Along with the oxidation of the positive electrode, the amount of carbon dioxide gas, that is, $CO_2$ gas generated becomes larger. Here, also because of the average fiber diameter of the carbon fibers being no more than 20 µm, it can be considered that the amount of carbon dioxide gas generated easily increased.

Furthermore, in each battery cell in the specific sample group, the amount of increase in cell resistance is larger than that of sample No. 100. A reason for this can be that as charging progresses, battery reaction failed to occur in a favorable manner as a result of, e.g., progress of oxidation of the positive electrode as described above.

Accordingly, it can be seen that when an RF battery cell with a quantity-per-unit-area ratio of more than 100% is operated, stopping charging based on the amount of carbon dioxide gas generated on the positive electrode side causes the amount of hydrogen gas generated on the negative electrode side to easily become smaller. Also, a trigger for stopping charging is a parameter other than an SOC and an OCV. Therefore, even where neither the SOC nor the OCV can be measured, it is possible to prevent the amount of hydrogen gas generated from becoming larger.

In this test, charge and discharge were conducted with the switching voltage kept constant. The switching voltage is represented by the sum of the open circuit voltage (OCV) of the electrolyte solution and current×cell resistance. Therefore, if the switching voltage is constant, as the cell resistance increases, the OCV is relatively lowered. If the OCV is lowered, the SOC is also lowered. In other words, the amount of hydrogen gas generated becomes smaller on the negative electrode side. In the specific sample group, as the sample number is larger, the amount of increase in cell resistance tends to be larger and the amount of hydrogen gas generated can be considered as being smaller. Therefore, a risk of overcharge is reduced. In this test, the cell resistivities were measured, and where the amount of increase in cell resistance is large, the amount of carbon dioxide gas generated is also large. Accordingly, the amount of carbon dioxide gas generated can be used as a trigger for stopping charging.

Besides the above, the following can be seen from this test.

The specific sample group and sample Nos. 101 and 102 will be compared. From this comparison, it can be seen that if the quantity-per-unit-area ratio is more than 103%, more specifically no less than 105%, the amount of hydrogen gas generated easily becomes smaller. Also, in the specific sample group, the amount of carbon dioxide gas generated is larger and the amount of increase in cell resistance is also larger than those of sample Nos. 101 and 102. Accordingly, if the quantity-per-unit-area ratio is no less than 105%, stopping charging based on the amount of carbon dioxide gas generated is expected to effectively reduce the amount of hydrogen gas generated. Also, in view of the amount of carbon dioxide gas generated and oxidative degradation of the positive electrode, it can be considered that the quantity-per-unit-area ratio is preferably no more than 190%.

Samples Nos. 103 and 104 and sample No. 100 will be compared. The amounts of hydrogen gas generated in sample Nos. 103 and 104 are smaller than the amount of hydrogen gas generated in sample No. 100. From this comparison, as described above, it can be seen that if the quantity-per-unit-area ratio is more than 100%, more specifically no less than 105%, the amount of hydrogen gas generated is reduced.

Furthermore, the specific sample group and sample Nos. 103 and 104 will be compared. From this comparison, if the quantity-per-unit-area ratio between the positive electrode and the negative electrode is more than 100% and the quantities per unit area of the positive electrode and the negative electrode are more than 18 g/m$^2$ and less than 600 g/m$^2$, more specifically no less than 20 g/m$^2$ and no more than 500 g/m$^2$, the amount of hydrogen gas generated more easily becomes small and the initial value of the cell resistivity tends to be small. Also, the amount of carbon dioxide gas generated tends to be large and thus can easily be used as a trigger for stopping charging.

In this test, the single-cell batteries were used, and multi-cell batteries exhibit a tendency that is similar to the above.

The present invention is not limited to these examples but is indicated by the claims and all changes that come within the meaning and range of equivalency of the claims are to be embraced within the present invention.

For example, in test example 1, the quantities per unit area of the positive electrodes and the quantities per unit area of the negative electrodes, the compositions of the electrolyte solutions, the number of cells, etc., can be changed.

REFERENCE SIGNS LIST 1 redox flow battery cell (RF battery cell)
10 redox flow battery system (RF battery system)
11 separator; 13 positive electrode; 14 negative electrode; 15 bipolar plate 16, 17 tank; 18, 19 pump
2 cell stack
20 sub cell stack; 21 end plate; 22 fastening member
23 supply/drainage plate
3 cell frame
30 frame body; 33, 34 solution-supply manifold; 35, 36 solution-drainage manifold
38 seal material
90 intervening device; 91 power generation unit; 92 load
160, 170 piping; 161, 171 outward piping; 162, 172 return piping

The invention claimed is:

1. A redox flow battery cell comprising a positive electrode and a negative electrode, wherein
each of the positive electrode and the negative electrode is an assembly containing a plurality of carbon fibers and
a quantity per unit area of the negative electrode is larger than a quantity per unit area of the positive electrode, wherein the quantity per unit area is a mass per unit area of the assembly.

2. The redox flow battery cell according to claim 1, wherein a ratio of the quantity per unit area of the negative electrode to the quantity per unit area of the positive electrode is no less than 105%.

3. The redox flow battery cell according to claim 1, wherein the quantity per unit area of the positive electrode and the quantity per unit area of the negative electrode are no less than 20 g/m$^2$ and no more than 500 g/m$^2$.

4. The redox flow battery cell according to claim 1, wherein an average fiber diameter of the carbon fibers is no more than 20 µm.

5. A cell stack comprising a plurality of the redox flow battery cells according to claim 1.

6. A redox flow battery system comprising the redox flow battery cell according to claim 1.

7. A redox flow battery system comprising the cell stack according to claim 5.

8. The redox flow battery cell according to claim 1, wherein the assembly is at least one of carbon felt, carbon cloth, and carbon paper consisting essentially of the plurality of carbon fiber and an average fiber diameter of the carbon fibers is no less than 1 µm and no more than 20 µm.

* * * * *